(12) United States Patent
Jo (10) Patent No.: US 11,685,209 B2
(45) Date of Patent: Jun. 27, 2023

(54) COMPOSITE MATERIAL BUSH

(71) Applicants: HYUNDAI MOTOR COMPANY, Seoul (KR); KIA MOTORS CORPORATION, Seoul (KR)

(72) Inventor: Gi-Bong Jo, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 256 days.

(21) Appl. No.: 16/702,946

(22) Filed: Dec. 4, 2019

(65) Prior Publication Data
US 2020/0207169 A1   Jul. 2, 2020

(30) Foreign Application Priority Data

Dec. 26, 2018 (KR) .................. 10-2018-0169233
Oct. 22, 2019 (KR) .................. 10-2019-0131156

(51) Int. Cl.
| | | |
|---|---|---|
| B32B 3/24 | (2006.01) | |
| B60G 7/00 | (2006.01) | |
| B29C 45/14 | (2006.01) | |
| B29K 105/04 | (2006.01) | |
| B29L 31/30 | (2006.01) | |
| B29K 705/12 | (2006.01) | |

(52) U.S. Cl.
CPC ........ B60G 7/001 (2013.01); B29C 45/14311 (2013.01); *B29C 2045/14327* (2013.01); *B29K 2105/04* (2013.01); *B29K 2705/12* (2013.01); *B29L 2031/30* (2013.01); *B60G 2204/41* (2013.01)

(58) Field of Classification Search
CPC .. F16C 11/0614; B60G 7/001; B60G 2204/41
See application file for complete search history.

(56) References Cited

U.S. PATENT DOCUMENTS

| | | | |
|---|---|---|---|
| 5,846,014 A | 12/1998 | Arthur et al. | |
| 8,037,573 B2 | 10/2011 | Bost, Jr. | |
| 8,382,129 B2 | 2/2013 | Sugiura et al. | |
| 8,419,033 B2 | 4/2013 | Kuroda | |
| 8,783,993 B2 * | 7/2014 | Brunneke ............ | F16F 1/3842 280/93.511 |
| 9,506,517 B2 | 11/2016 | Cha | |
| 2006/0163788 A1 * | 7/2006 | Kiddle .................. | B60G 11/64 267/293 |
| 2009/0249581 A1 | 10/2009 | Bost, Jr. | |
| 2010/0183848 A1 | 7/2010 | Krause | |
| 2010/0244395 A1 | 9/2010 | Sugiura et al. | |
| 2011/0169242 A1 | 7/2011 | Kuroda | |
| 2012/0098226 A1 | 4/2012 | Rodecker et al. | |
| 2012/0223499 A1 | 9/2012 | Sugiura et al. | |

(Continued)

FOREIGN PATENT DOCUMENTS

| | | |
|---|---|---|
| JP | 7-54919 A | 2/1995 |
| JP | 2010-101385 A | 5/2010 |

(Continued)

*Primary Examiner* — William P Watkins, III
(74) *Attorney, Agent, or Firm* — Morgan, Lewis & Bockius LLP (57) ABSTRACT

A composite material bush may include a center plate; and an outer foam which is arranged outside the center plate to surround the center plate and is made of different kinds of materials.

15 Claims, 8 Drawing Sheets

(56) References Cited

U.S. PATENT DOCUMENTS

2016/0052357 A1 2/2016 Cha
2017/0334147 A1* 11/2017 Mayer ............... B29C 66/30325

FOREIGN PATENT DOCUMENTS

| KR | 10-2004-0001671 A | 1/2004 |
| KR | 10-2010-0093604 A | 8/2010 |
| KR | 10-2011-0026240 A | 3/2011 |
| KR | 10-2011-0049815 A | 5/2011 |
| KR | 10-2013-0125062 A | 11/2013 |
| KR | 10-1538422 B1 | 7/2015 |
| KR | 10-2016-0022560 A | 3/2016 |
| KR | 10-2016-0055572 A | 5/2016 |
| KR | 10-2018-0041422 A | 4/2018 |

* cited by examiner

COMPOSITE MATERIAL BUSH

CROSS-REFERENCE(S) TO RELATED APPLICATIONS

This application claims priority to Korean Patent Application No. 10-2018-0169233, filed on Dec. 26, 2018, and Korean Patent Application No. 10-2019-0131156, filed on Oct. 22, 2019, which are incorporated herein by reference in their entirety.

BACKGROUND OF THE DISCLOSURE

Field of the Disclosure

The present disclosure relates to a composite material bush, and more particularly, to a composite material bush in which different kinds of materials are mixed.

Description of Related Art

A vehicle is equipped with a suspension that attenuates a ground impact and connects a wheel to the vehicle. The suspension can be divided into a rigid axle suspension with both wheels connected to one axle and an independent suspension with both wheels connected to each axle depending on its shape.

Examples of the independent suspensions include a McPherson strut, a double wishbone, and a multi-link suspension. A dual rear multi-link suspension includes an upper arm connecting between an axle and a frame, a lower arm, a rear sub-frame, and a trailing arm connecting between the axle and a vehicle body.

A trailing arm bush is provided on a connecting portion connecting between the trailing arm and the vehicle body. A through hole having a predetermined size is formed on an end portion of the trailing arm. The trailing arm bush is press-fitted into the through hole to buffer vibrations or shocks received from the road surface, thereby minimizing the transmission of the vibrations or shocks to the vehicle body.

Figure 1:
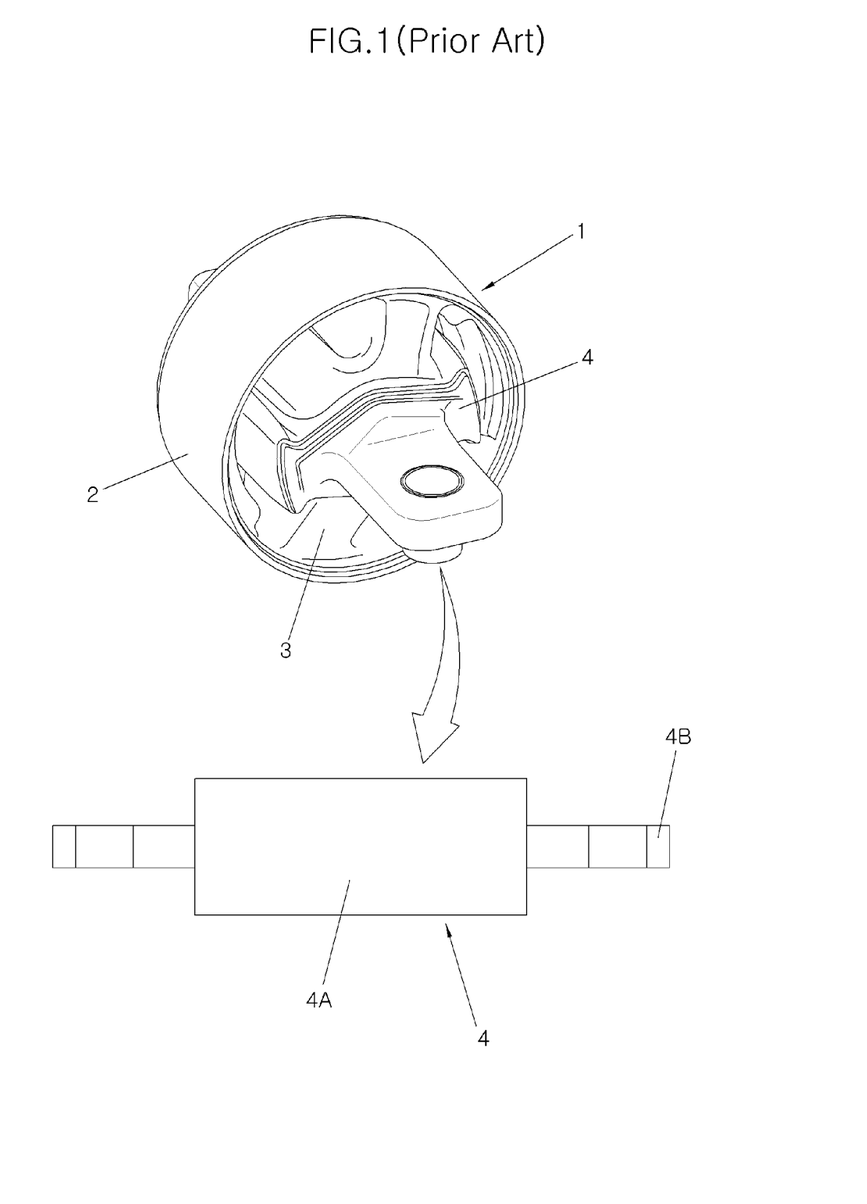
FIG. 1 shows an exemplified view of a conventional trailing arm bush.

FIG. 1 shows a conventional trailing arm bush 1. As shown in FIG. 1, the conventional trailing arm bush 1 includes an outer iron 2 having a predetermined diameter, a cylindrical rubber 3 mounted inside the outer iron 2, and a core 4 which penetrates through a center of the rubber 3 and is connected to a vehicle body.

However, the core 4 provided in the conventional trailing arm bush 1 was produced by casting alloys. A time difference occurs between cooling of a center 4A of a relatively thick core and cooling of an end portion 4B of a relatively thin core after the casting, and therefore it is difficult for the center 4A and the end portion 4B of the core to have uniform strength.

SUMMARY OF THE DISCLOSURE

The present disclosure has been made to solve the above problems and an object of the present disclosure is to provide a composite material bush in which a center and an end portion of a core can have uniform strength.

A composite material bush includes: a center plate; and an outer foam which is formed outside the center plate to surround the center plate and is made of different kinds of materials.

A hole may be formed at a center of the center plate to prevent the outer foam from being separated from the center plate.

A pin having a length larger than the thickness of the center plate and smaller than the thickness of the outer foam may be mounted in the hole.

A central area of the center plate may be bent at least once to prevent the outer foam from being separated from the center plate.

A center of the center plate may be provided with a hole to prevent the outer foam from being separated from the center plate, and the central area of the center plate may be bent at least once.

A corner of the center plate may be provided with a separation preventing jaw to prevent the outer foam from being separated from the center plate.

The center plate may have a rectangular shape and the separation preventing jaws may be formed at any one of long corners of the center plate to face each other.

The center plate may have a rectangular shape, and the separation preventing jaw may be formed by being cut inwardly from an outer side of a long corner of the center plate.

The center plate and the outer foam may be selectively made of a material having target strength or ductility among metals or nonmetals.

The center plate may be made of a steel material having strength by press molding or extrusion molding, and the outer foam may be formed outside the center plate by injection molding and made of a plastic material.

Both ends of the center plate in a longitudinal direction may be each provided with a fastening hole.

The fastening hole may be provided with a guide pin.

A center of the fastening hole may be formed not to be located on a central axis of the center plate in the longitudinal direction.

Radii of curvature of each corner of the center plate may be different from each other.

An imaginary first line segment passing through two sides of the center plate (e.g., through centers of the two sides of the center plate) in a width direction and an imaginary second line segment passing through two sides of the outer foam (e.g., through centers of the two sides of the outer foam) in a width direction may not coincide with each other.

A central area of the center plate which is in contact with the outer foam may be provided with a bonding material.

The bonding material may be a material melted by heat when the outer foam is injection-molded.

A melting point of the center plate may be higher than that of the outer foam, and the melting point of the outer foam may be higher than that of the bonding material.

According to the composite material bush in accordance with the embodiment of the present disclosure configured as described above, since the core is provided in the form that the outer foam is mounted outside the center plate, the strength of the center and the end portion of the core can be uniform and the core can have the same shape as the conventional core.

Further, since the center plate is obliquely provided on the outer foam, the vehicle body fastening can be easily made.

Further, since the fastening holes are provided on both ends of the center plate to have the offset, the area of the center plate is increased and the stiffness is increased. The bonding strength between the center plate and the outer foam is increased.

Further, since the radii of curvature of the corners of the center plate are provided to be different from each other, the radii of curvature can be variably applied so as to be optimized for the vehicle body fastening.

Further, it is possible to secure the productivity, reliability, and quality of the bush.

DESCRIPTION OF SPECIFIC EMBODIMENTS

Hereinafter, a composite material bush according to an embodiment of the present disclosure will be described in detail with reference to the accompanying drawings.

As shown in FIGS. 2 to 10, a composite material bush according to an embodiment of the present disclosure includes a core comprising a center plate 100 and an outer foam 200 which is formed outside the center plate 100 to surround the center plate 100 and is made of different kinds of materials. A rubber is mounted outside the outer foam 200, and an outer iron is mounted to surround an outside of the rubber. The composite material bush according to the embodiment of the present disclosure may have a variety of names and may be applied to a plurality of interconnected links to form a vehicle structure.

As materials constituting the center plate 100 and the outer foam 200, materials satisfying target strength, ductility, or workability among metals or nonmetals may be selectively applied. When selecting materials forming the center plate 100, it is preferable to select materials that provide uniform strength throughout a center portion of the core of the composite material bush up to an end portion of the core. In the case where the outer foam 200 is selectively made of materials whose shapes are easily changed and which have high workability when being produced, the outer foam 200 may have any shapes which are the same shape as the conventional core or may be applied to a specific link.

The center plate 100 is connected to the vehicle body to support a load from the vehicle body. The outer foam 200 transmits the load transmitted from the vehicle body to the center plate 100 to the rubber. A shape of the rubber is determined according to the shape of the outer foam 200. The outer foam 200 should have strength that is not damaged by the load transmitted from the center plate 100. The outer foam 200 may be made of plastic, aluminum, or magnesium.

According to one example, the center plate 100 is made of steel having strength. The center plate 100 is produced by press molding or extrusion molding. The center plate 100 may be made of various materials like general high stress steel such as SAPH440, a steel material such as S25C and S45C, or the like.

The outer foam 200 may be made of a plastic material. The outer foam 200 may be formed outside the center plate 100 by injection molding. The outer foam 200 may be selectively made of a material having a lower melting point than the central plate 100 so that the shape of the center plate 100 can be maintained during the injection molding. The outer foam 200 may be made of plastics in which general nylon series such as PA66+GF30% (PA66 reinforced with glass fiber (30%)) and glass fiber are mixed or other various plastic that can be injection-molded. The outer foam 200 may be manufactured with a composition of PA66+GF30% or PA66+GF50%. The outer foam 200 may be manufactured in various compositions other than PA66+GF30% or PA66+GF50%.

Figure 2:
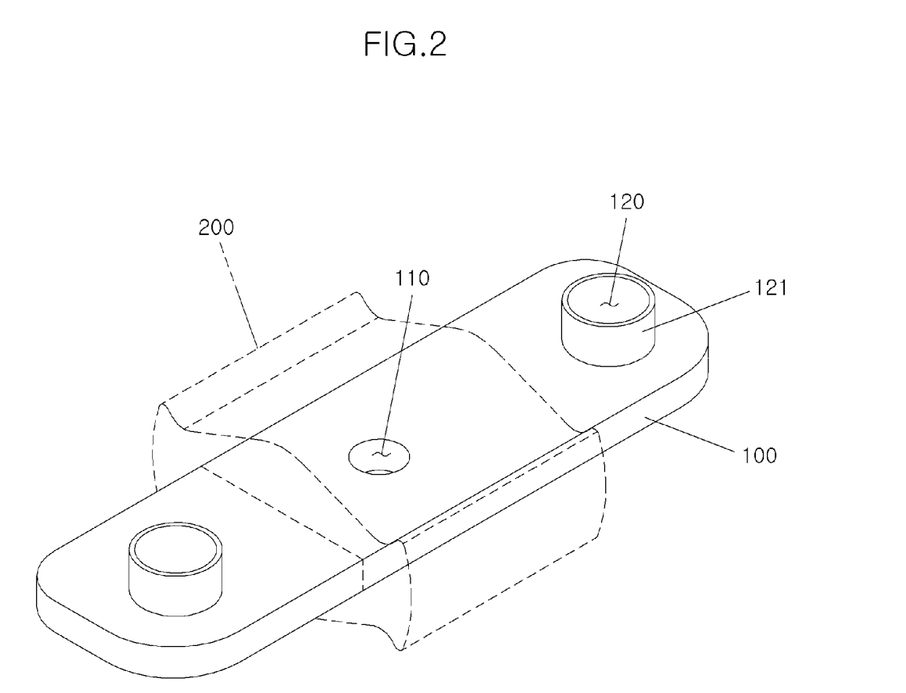
FIGS. 2 and 4 are perspective views of a core provided in a composite material bush according to an embodiment of the present disclosure.

As shown in FIG. 2, as the outer foam 200 is connected to the center plate 100 by penetrating through the center plate 100 during the injection molding, a hole 110 is formed at a center of the center plate 100 to prevent the outer foam 200 from being separated from the center plate 100. One or more holes 110 may be provided.

Figure 3:
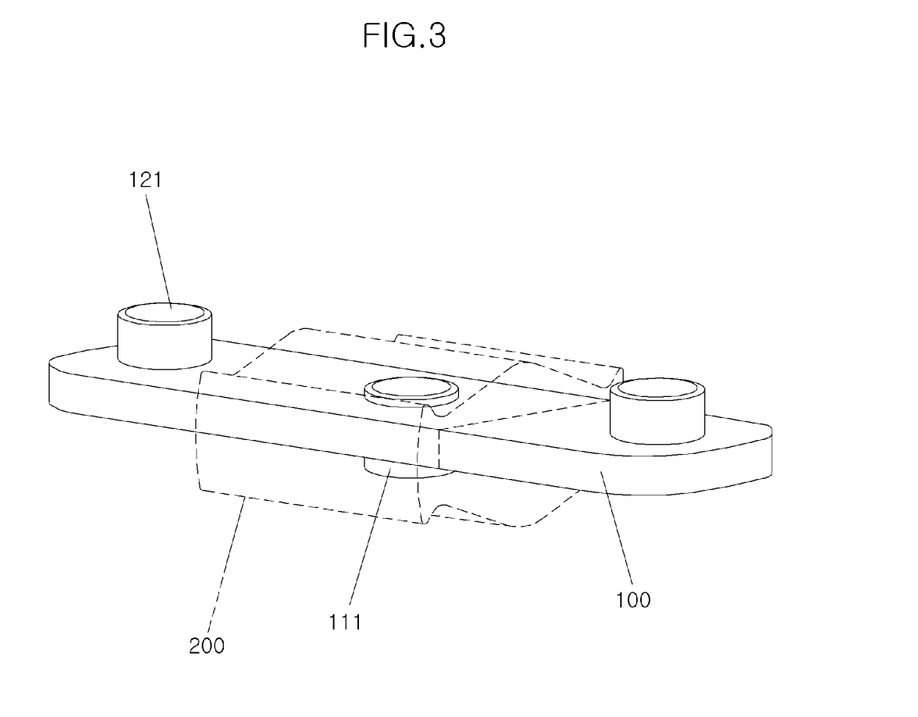

As shown in FIG. 3, a pin 111 that shaped like pipe may be mounted in the hole 110. The pin 111 has a length larger than the thickness of the center plate 100 and smaller than the thickness of the outer foam 200.

Figure 4:
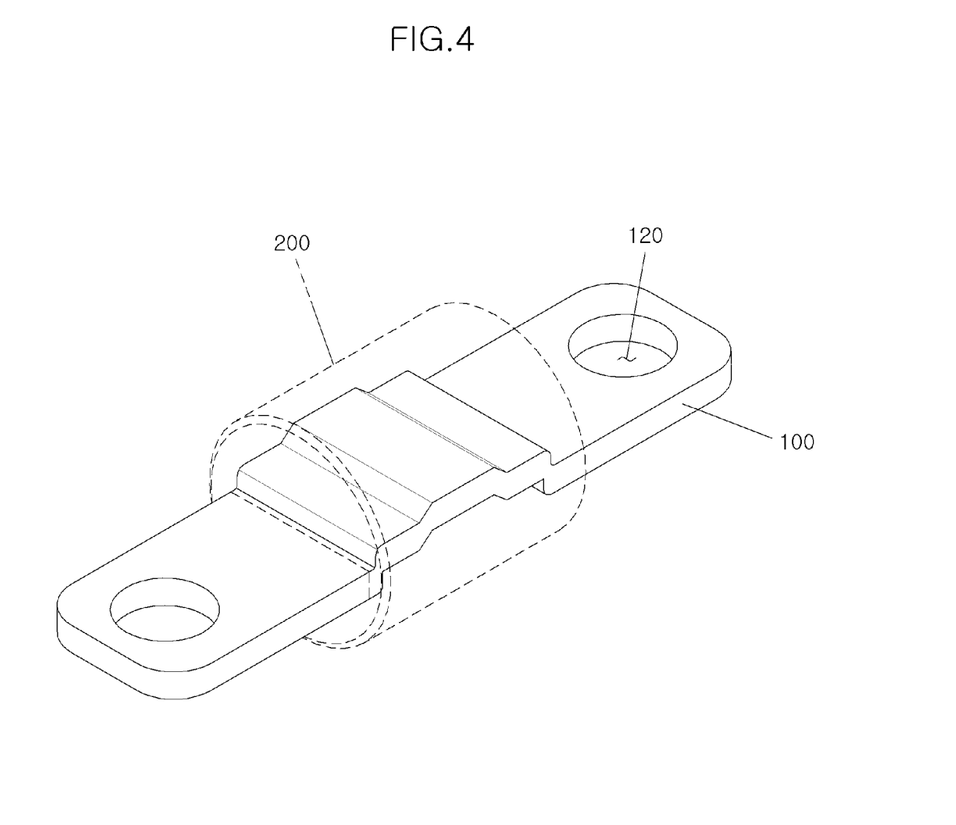

As shown in FIG. 4, a central area of the center plate 100 may be bent (i.e., the top face of the central area of the center plate 100 is raised) at least once to prevent the outer foam 200 from being separated from the center plate 100. In addition, the hole 110 may be provided at the center of the center plate 100 and the central area of the center plate 100 may be bent at least once so as to be able to prevent the outer foam 200 from being separated from the center plate 100.

Figure 5:
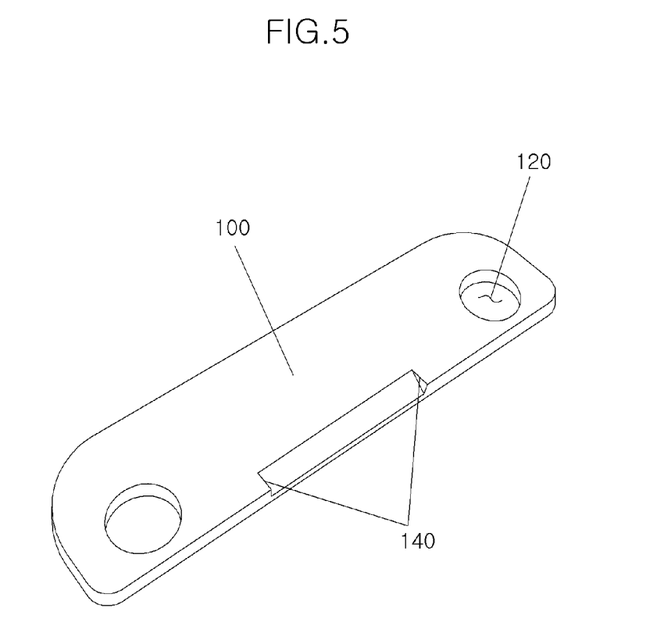
FIGS. 5 to 7 are exemplified views of a center plate of FIG. 2.
Figure 6:
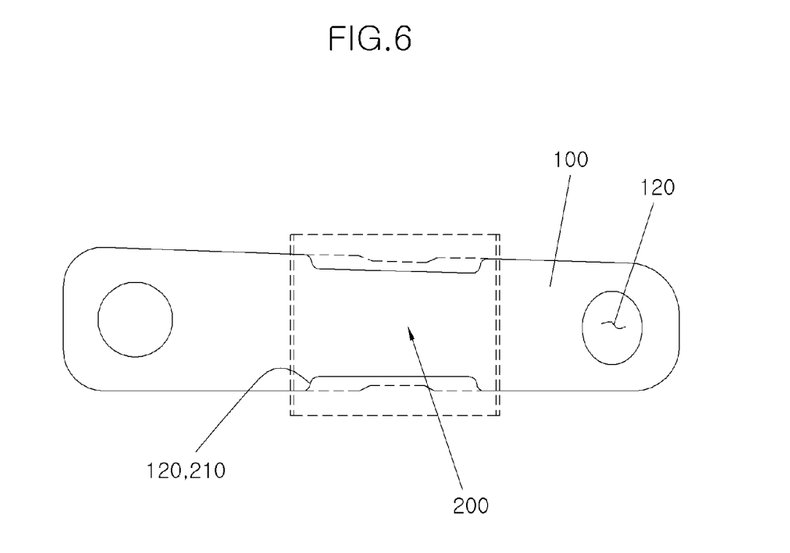

As shown in FIGS. 5 and 6, the center plate 100 may be formed in a rectangular shape, and a separation preventing jaw 140 may be formed on the center plate 100 to prevent the outer foam 200 from being separated from the center plate 100. When the outer foam 200 is formed on the center plate 100 by the injection molding, a protruding jaw 210 which is in contact with the separation preventing jaw 140 is formed on an inner side of the outer foam 200. The outer foam 200 is prevented from being separated from the center plate 100 by bringing the separating preventing jaw 140 into contact with the protruding jaw 210.

As shown in FIG. 5, the separation preventing jaw 140 may be formed at the center portion of one of the long edge of the center plate 100. Any one of the long edge of the center plate 100 is continuously subjected to cutting working at a predetermined angle from an end portion of a bottom surface of the center plate 100, and as a result, the separation preventing jaw 140 is formed to face the corners of the center plate 100.

As shown in FIG. 6, the separation preventing jaw 140 may be formed by being cut inwardly from the outer sides of the long corners of the center plate 100.

Referring to FIGS. 2 to 7, fastening holes 120 are each formed at both ends of the center plate 100 in a longitudinal direction. When connecting the vehicle body, each of the fastening holes 120 is provided with hinges extending from the vehicle body. The fastening holes 120 are provided with guide pins 121 (see FIG. 2).

The guide pin 121 is produced to have a longer length than a depth of the fastening hole 120 so as to protrude from the center plate 100. The guide pin 121 is made of steel having strength equal to or higher than that of the center plate 100.

Figure 7:
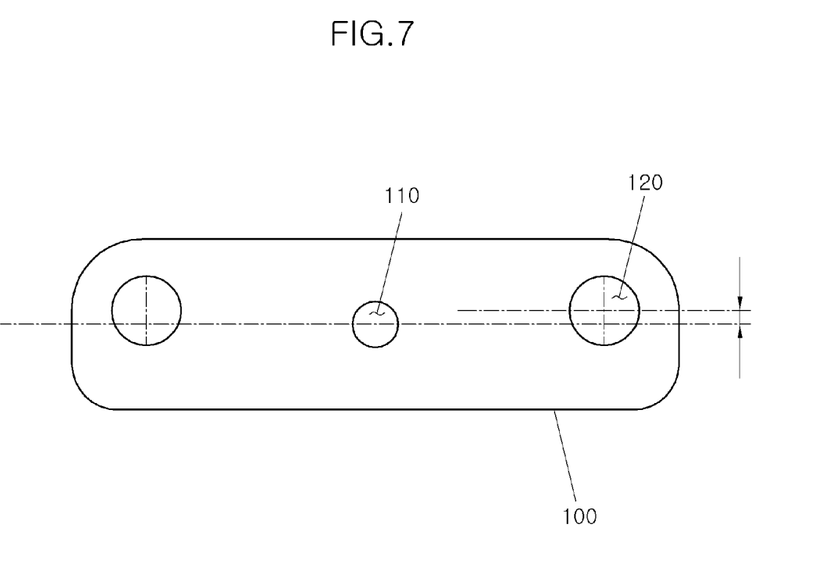

The fastening hole 120 may be formed so that a center thereof is not located on a central axis of the center plate 100 in a longitudinal direction (see FIG. 7). When the center of the fastening hole 120 is not aligned with the central axis of the center plate 100, the shortest distance from one side of the center plate 100 to the edge of the fastening hole 120 is larger than the shortest distance from the opposite side of the center plate to the edge of the fastening hole 120. When a hinge presses one side of the center plate 100 having a larger distance, the space in which the shape of the center plate 100 is deformed is reduced as compared with the case where both sides of the shortest distance between the side of the center plate 100 and the edge of the fastening hole 200 have the same distance. That is, as the area pressed by the hinge is increased, the stiffness of the center plate 100 is relatively increased. At least because of the above structure, the width of the central area of the center plate 100 can be increased as needed.

Accordingly, a width of the central plate 100 around the bonding area between the center plate 100 and the outer foam 200 can be increased and the bonding strength can be increased.

The center plate 100 may be produced so that the radii of curvature of each corner are different from each other. The radii of curvature of each corner of the center plate 100 can be adjusted to be optimized for the vehicle body fastening.

Referring to FIGS. 2 and 4, the outer foam 200 may be produced so that the surface thereof is bent (i.e., the top face of the central area of the center plate 100 is raised) at least once (see FIG. 2, FIG. 3), or may be formed in a cylindrical shape (see FIG. 4).

Figure 8:
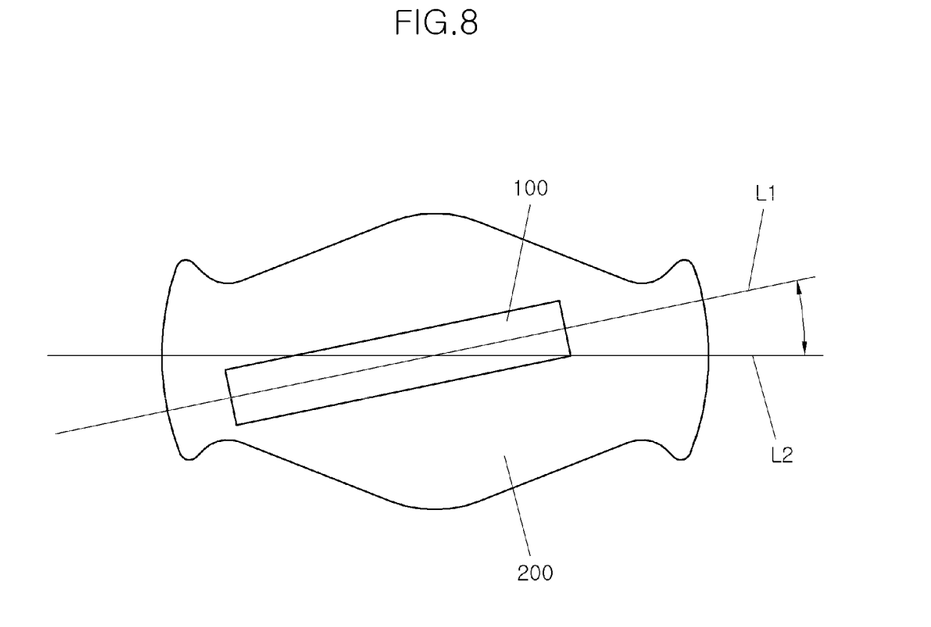
FIG. 8 is a cross-sectional view of the core provided in the composite material bush of FIG. 2.

Referring to FIG. 8, in order to facilitate the vehicle body fastening of the bush, the center plate 100 is obliquely provided on the outer foam 200 so that an imaginary first line segment L1 passing through two sides of the center plate 100 (e.g., through centers of the two sides of the center plate 100) in a width direction and an imaginary second line segment L2 passing through two sides of the outer foam 200 (e.g., through centers of the two sides of the outer foam 200) in a width direction do not coincide with each other.

The first line segment L1 and the second line segment L2 are provided at an angle of 10°. The center plate 100 may be obliquely provided on the outer foam 200 so that the first line segment L1 and the second line segment L2 form an angle of 10° or more or 10° or less in consideration of the shape of the vehicle body and the shape of the trailing arm.

Figure 9:
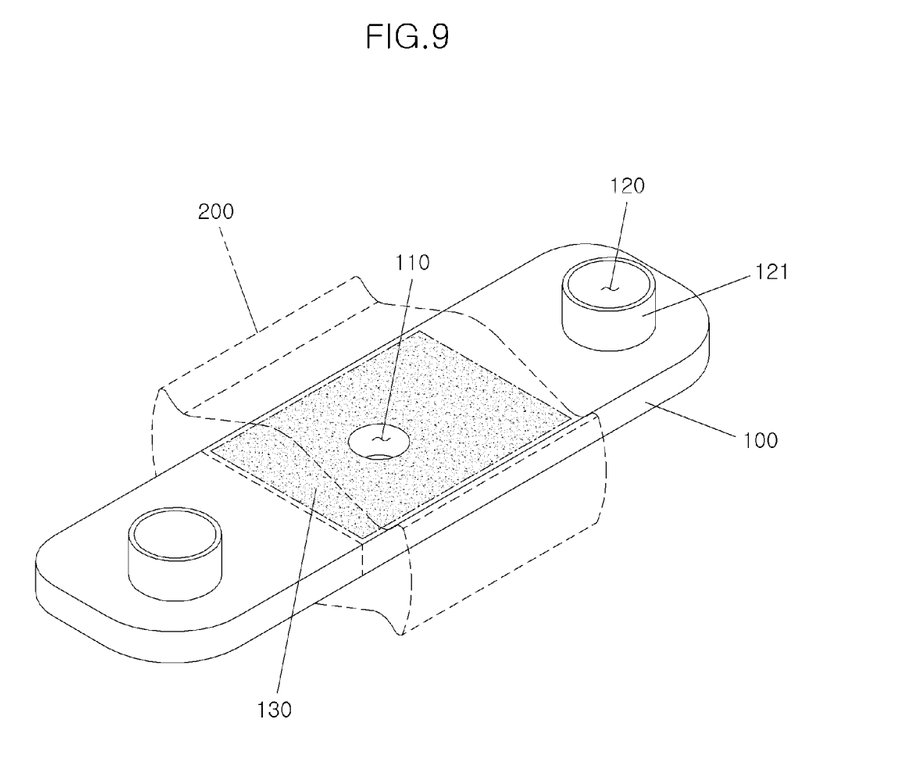
FIG. 9 is an exemplified view of a bonding material provided in the composite material bush of FIG. 2.

Referring to FIG. 9, a bonding material is provided in the central area of the center plate 100 where the center plate 100 and the outer foam 200 are in contact with each other. The bonding material may be provided on both sides of the center plate 100. The bonding material may be provided as a bonding film 130, which is melted by heat during the injection molding of the material to form the outer foam 200. As a result, the center plate 100 made of a steel material and the outer foam 200 made of a plastic material are bonded to each other.

In addition to the bonding film 130, any materials melted by heat, for example, non-metallic materials (synthetic resin) such as bond and resin, and metallic materials such as silver solder, may be used as the bonding material. The bonding material may be selected as a material having a lower melting point than the outer foam 200 so that the bonding material can be easily melted when the outer foam 200 is formed on the surface of the center plate 100 by the injection molding.

Figure 10:
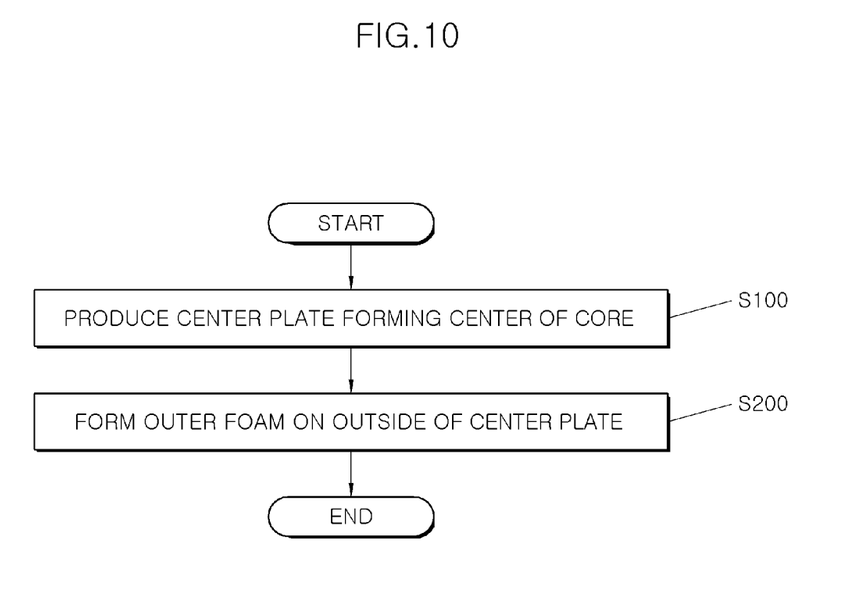
FIG. 10 is a flow chart of a method of producing a core provided in a composite material bush according to an embodiment of the present disclosure.

The composite material bush according to the embodiment of the present disclosure configured as above can be produced according to the procedure shown in FIG. 10. As shown in FIG. 10, the composite material bush according to the embodiment of the present disclosure is manufactured by producing the center plate 100 constituting the center of the core of the composite material bush (S100) and forming the outer foam 200, which is made of different kinds of materials, on the outside of the center plate 100 (S200).

According to an example, in the step S100 in which the center plate 100 is produced, the center plate 100 is produced by the press molding or the extrusion molding. In the forming of the outer foam 200 (S200), the outer foam 200 is formed outside the center plate 100 by the injection molding.

In the production of the center plate 100 (S100), the hole 110 is formed at the center of the center plate 100 in order to prevent the outer foam 200 from being separated from the center plate 100. Further, the central area of the center plate 100 is bent (i.e., the top face of the central area of the center plate 100 is raised) at least once so that the outer foam 200 is prevented from being detached from the center plate 100. The bonding material can be provided at the central area of the center plate 100. The bonding material can be a material which is melted by heat provided during the injection molding to form the outer foam 200 (S200). The center plate 100 and the outer foam 200 are bonded to each other as the bonding material is melted.

In the production of the center plate 100 (S100), the fastening holes 120 are each formed at both ends of the center plate 100 in the longitudinal direction so that the centers thereof are not located on the central axis of the center plate 100 in the longitudinal direction. In addition, each corner of the center plate 100 is machined to have different radii of curvature.

In the formation of the outer foam 200 (S200), the outer foam 200 is formed around at least center portion of the center plate 100 by the injection molding so that the imaginary first line segment L1 passing through two sides of the center plate 100 in the width direction and the imaginary second line segment L2 passing through two sides of the outer foam 200 in the width direction do not coincide with each other. The center plate 100 is obliquely mounted on a machine injection-molding the outer foam 200 so that the center plate 100 may be obliquely provided on the outer foam 200.

According to the composite material bush comprising a core in accordance with the embodiment of the present disclosure configured as above, the center plate 100 is made of the material having strength, such that the strength of the center of the core and the strength of the end portion of the core can be uniformly provided. In particular, since the outer foam 200 made of a plastic material having high workability is provided outside the center plate 100, the outer foam 200 may have the same shape as that of the conventional core or have an appropriate shape according to the shape of the link to be applied.

Further, since the center plate 100 is obliquely provided on the outer foam 200, the vehicle body fastening is facilitated. Since the fastening holes 120 are provided on both ends of the center plate 100 to have the offset, the area of the center plate 100 is increased and the stiffness is increased. The bonding strength between the center plate 100 and the outer foam 200 is increased. Further, since the radii of curvature of the corners of the center plate 100 are provided to be different from each other, the radii of curvature can be variably applied so as to be optimized for the vehicle body fastening. Consequently, it is possible to secure the productivity, reliability, and quality of the bush.

On the other hand, the performance of the bush is determined by the stiffness and properties of the rubber. The stiffness and properties of the rubber are determined by the shape and material of the rubber. The rubber is firmly bonded to the outer iron and the outer foam 200. The shape of the rubber is determined by the shape of the outer iron and the outer foam 200.

In order to secure the free performance of the rubber, the shape of the outer foam 200 should be freely set. The material of the outer foam 200 should be easily adaptable to the deformed shape. That is, the workability should be high. In order to freely set the shape of the outer foam 200, it is preferable to apply the injection molding as described above. As described above, examples of the materials of the outer foam 200 suitable for the injection molding include plastic, aluminum, magnesium, or the like.

The center plate 100 may secure the stiffness, and the outer foam 200 made of plastic, aluminum or magnesium material may be formed on the surface of the center plate 100 in the required shape. Accordingly, according to one embodiment of the present disclosure, the bush suitably applicable to any link present in the vehicle can be produced.

What is claimed is:

1. A composite material bush comprising a core having a center portion and end portions, wherein the core comprises:
   a center plate; and
   an outer foam arranged outside the center plate to surround the center plate and is made of different kinds of materials,
   wherein a central area of the center plate includes a specific portion to prevent the outer foam from being separated from the center plate,
   wherein the center plate contains a steel material that provides uniform strength throughout the center portion of the core up to the end portions of the core,
   wherein the outer foam is arranged outside the center plate and contains a plastic material,
   wherein the specific portion includes a separation preventing jaw formed on the central area of the center plate, and a protruding jaw which is in contact with the separation preventing jaw is formed on an inner side of the outer foam, such that the outer foam is prevented from being separated from the center plate,
   wherein fastening holes are arranged at respective ends of the center plate in a longitudinal direction,
   wherein a center of each fastening hole deviates from a central axis of the center plate in the longitudinal direction to increase a width of the center plate around a bonding area between the center plate and the outer foam, and
   wherein the center plate is obliquely provided on the outer foam in which an imaginary first line segment passing through the central axis of the center plate is inclined at an angle with an imaginary second line segment passing through a central axis of the outer foam to facilitate fastening of the bush.

2. The composite material bush of claim 1, wherein a hole is arranged at a center of the center plate to prevent the outer foam from being separated from the center plate.

3. The composite material bush of claim 2, wherein a pin having a length larger than the thickness of the center plate and smaller than the thickness of the outer foam is mounted in the hole.

4. The composite material bush of claim 1, wherein the separation preventing jaw is placed at a corner of the center plate.

5. The composite material bush of claim 4, wherein the center plate has a rectangular shape, and
   wherein the separation preventing jaws are arranged at any one of long corners of the center plate to face each other.

6. The composite material bush of claim 4, wherein the center plate has a rectangular shape, and
   wherein the separation preventing jaw is arranged by being cut inwardly from an outer side of a long corner of the center plate.

7. The composite material bush of claim 1, wherein the center plate and the outer foam selectively include a material having target strength or ductility among metals or nonmetals.

8. The composite material bush of claim 1, wherein a guide pin is arranged at each fastening hole.

9. The composite material bush of claim 1, wherein radii of curvature of each corner of the center plate are different from each other.

10. The composite material bush of claim 1, wherein the imaginary first line segment passes through two sides of the center plate in a width direction and the imaginary second line segment passes through two sides of the outer foam in a width direction, wherein the imaginary first and second line segments do not coincide with each other.

11. The composite material bush of claim 1, wherein a boding material is disposed on a central area of the center plate which is in contact with the outer foam.

12. The composite material bush of claim 10, wherein the angle between the imaginary first line segment and the imaginary second line segment is formed at 10° or more.

13. The composite material bush of claim 11, wherein the bonding material is disposed on both sides of the center plate.

14. A method of manufacturing a composite material bush comprising a core containing a center plate and an outer foam arranged outside the center plate, the method comprising:
   performing a press molding or an extrusion molding of a steel material to form the center plate;
   providing a bonding material at a center portion of the center plate where at least some portion of the center plate contacts with the outer foam; and
   performing injection molding of a material to form the outer foam, thereby melting the bonding material and bonding the center plate to the outer foam,
   wherein a central area of the center plate includes a specific portion to prevent the outer foam from being separated from the center plate,
   wherein the outer foam contains a plastic material,
   wherein the specific portion includes a separation preventing jaw formed on the central area of the center plate, and a protruding jaw which is in contact with the separation preventing jaw is formed on an inner side of the outer foam, such that the outer foam is prevented from being separated from the center plate,
   wherein fastening holes are arranged at respective ends of the center plate in a longitudinal direction,
   wherein a center of each fastening hole deviates from a central axis of the center plate in the longitudinal direction to increase a width of the center plate around a bonding area between the center plate and the outer foam, and
   wherein the center plate is obliquely provided on the outer foam in which an imaginary first line segment passing through the central axis of the center plate is inclined at an angle with an imaginary second line segment passing through a central axis of the outer foam to facilitate fastening of the bush.

15. The method according to claim 14, wherein a melting point of the steel material forming the center plate is higher than that of the material forming the outer foam, and the melting point of the material forming the outer foam is higher than that of the bonding material.

\* \* \* \* \*